United States Patent [19]
Kalnes et al.

[11] Patent Number: 5,552,037
[45] Date of Patent: Sep. 3, 1996

[54] PROCESS FOR THE TREATMENT OF TWO HALOGENATED HYDROCARBON STREAMS

[75] Inventors: Tom N. Kalnes, La Grange; Robert B. James, Jr., Northbrook, both of Ill.

[73] Assignee: UOP, Des Plaines, Ill.

[21] Appl. No.: 299,873

[22] Filed: Sep. 1, 1994

Related U.S. Application Data

[63] Continuation-in-part of Ser. No. 81,715, Jun. 25, 1993, abandoned.

[51] Int. Cl.$^6$ .............................. B62D 3/00; C01G 17/00; C07C 1/00
[52] U.S. Cl. .................. 208/262.1; 585/733; 588/206
[58] Field of Search .............................. 423/481, 240 R; 588/206, 207, 209, 213; 208/262.1, 262.5; 585/733

[56] References Cited

U.S. PATENT DOCUMENTS

| | | | |
|---|---|---|---|
| 4,098,833 | 7/1978 | Wristers | 260/688 |
| 4,840,721 | 1/1989 | Kalnes et al. | 208/57 |
| 4,895,995 | 1/1990 | James, Jr. et al. | 208/262.5 |
| 4,899,001 | 2/1990 | Kalnes | 208/262.5 |
| 4,902,842 | 2/1990 | Kalnes et al. | 208/262.5 |
| 4,923,590 | 5/1990 | Kalnes et al. | 208/85 |
| 4,929,781 | 5/1990 | James, Jr. et al. | 585/310 |
| 5,013,424 | 5/1991 | James, Jr. et al. | 208/78 |
| 5,238,656 | 8/1993 | Tajima et al. | 423/240 S |
| 5,314,614 | 3/1994 | Moser et al. | 208/262.5 |
| 5,354,931 | 10/1994 | Jan et al. | 208/262.5 |
| 5,401,894 | 3/1995 | Braser et al. | 208/164 |

Primary Examiner—Gary P. Straub
Attorney, Agent, or Firm—Thomas K. McBride; John G. Tolomei; John G. Cutts

[57] ABSTRACT

An integrated process for simultaneously treating a halogenated organic stream containing less than about 500 ppm by weight of water or water precursors and a halogenated organic stream containing oxygen-containing compounds to produce hydrocarbonaceous compounds having a reduced level of organic halogen and a hydrogen halide stream containing less than about 500 ppm by weight of water.

18 Claims, 1 Drawing Sheet

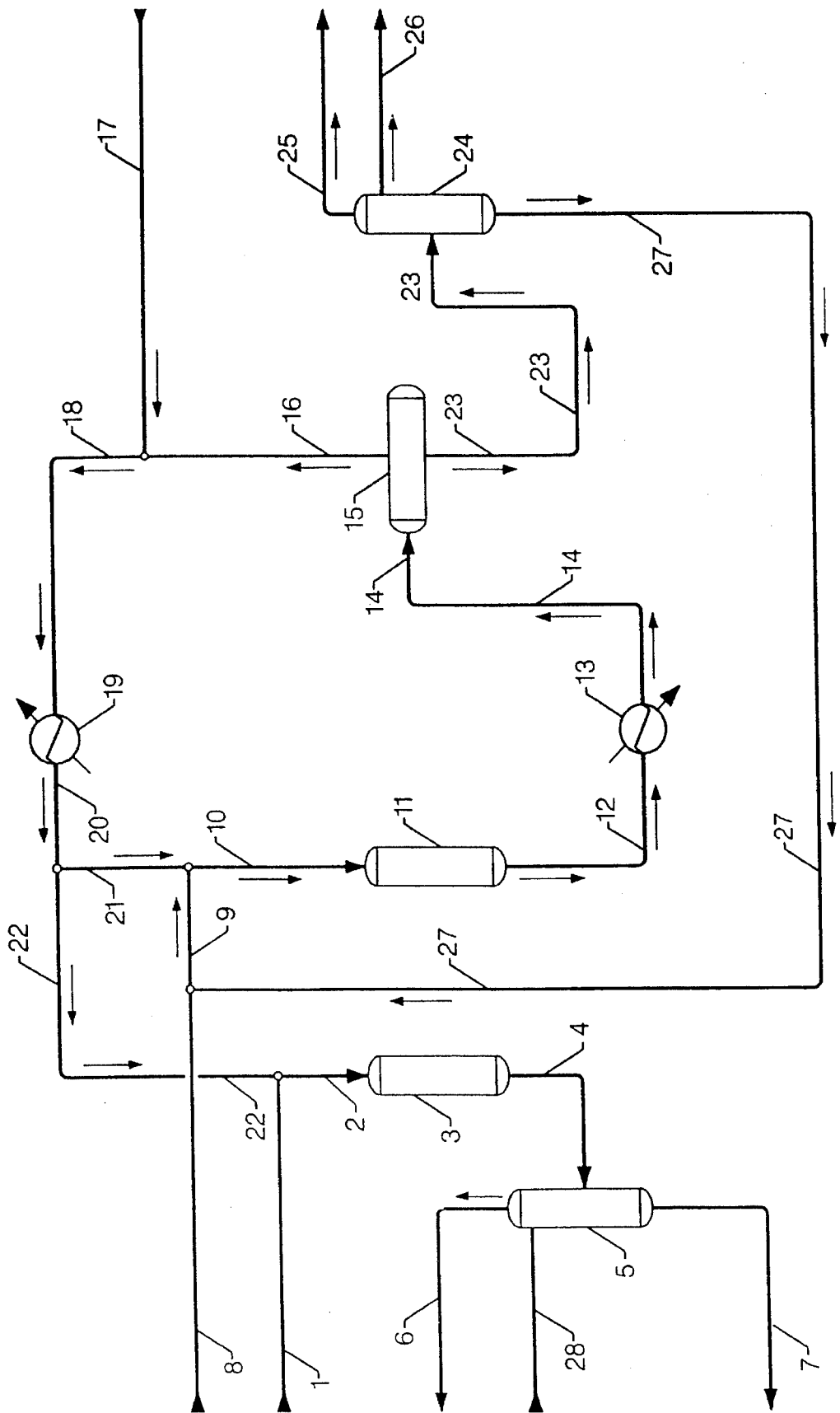

PROCESS FOR THE TREATMENT OF TWO HALOGENATED HYDROCARBON STREAMS

CROSS REFERENCE TO RELATED APPLICATION

This is a continuation-in-part of application Ser. No. 08/081,715 filed on Jun. 25, 1993 now abandoned, which is incorporated by reference.

BACKGROUND OF THE INVENTION

The field of art to which this invention pertains is the production of hydrogenated hydrocarbonaceous compounds and a hydrogen halide stream containing less than about 500 ppm by weight of water from a halogenated organic stream containing less than about 500 ppm by weight of water or water precursors and a halogenated organic stream containing oxygen-containing compounds.

There is a steadily increasing demand for technology which is capable of treating in an economical manner both a halogenated organic stream containing less than about 500 ppm by weight of water or water precursors and a halogenated organic stream containing oxygen-containing compounds to produce hydrocarbonaceous compounds and a hydrogen halide stream containing less than about 500 ppm by weight of water.

With the increased environmental emphasis for the treatment and recycle of organic waste streams containing halogenated compounds, there is an increased need for improved processes to convert organic waste streams to produce hydrogenated organic compounds and hydrogen halide. For example, during the disposal or recycle of potentially environmentally harmful organic waste streams, an important step in the total solution to the problem is to produce an organic stream which facilitates the ultimate resolution to produce product streams which may subsequently be handled in an environmentally acceptable manner. One environmentally attractive method of treating organic waste streams is by hydrogenation. Often in an industrial complex used to produce or process petrochemicals, there are two or more by-product or waste streams which must be treated, converted, recycled or otherwise managed. Therefore, those skilled in the art have sought to find feasible and economical techniques to convert organic waste streams containing halide compounds to hydrogenated organic compounds and to recover the concomitantly-produced hydrogen halide. When hydrogen halide is produced, a necessary concern is to be able to recover the hydrogen halide in a manner which does not corrode the metallurgy in the processing plant.

INFORMATION DISCLOSURE

In U.S. Pat. No. 4,923,590 (Kalnes et al), a process is disclosed wherein the effluent from a hydrogenation reaction zone is contacted with an aqueous scrubbing solution. In one embodiment, the '590 patent teaches that when the feed to the hydrogenation zone comprises halogenated compounds, the aqueous scrubbing solution preferably contains a basic compound to neutralize the acid.

In U.S. Pat. No. 4,929,781 (James, Jr. et al), a process is disclosed for the simultaneous hydroconversion of a first feedstock comprising unsaturated, halogenated organic compounds and a second feedstock comprising saturated, halogenated organic compounds. Hydrogen halide is recovered with a lean aqueous solution.

In U.S. Pat. No. 4,098,833 (Wristers), a process is disclosed for the regeneration of a deactivated hydrocarbon conversion catalyst comprising a metal halide in combination with a Bronsted acid containing fluorine that has become deactivated by the formation of allyl and alkylaromatic carbonium ion complexes with the acid during contact with a hydrocarbon feedstock by contacting the deactivated catalyst with a supported noble metal hydrogenation component in the presence of molecular hydrogen.

The prior art fails to disclose a process for the simultaneous conversion of a halogenated organic stream containing less than about 500 ppm by weight of water or water precursors and a halogenated organic stream containing oxygen-containing compounds to produce hydrocarbonaceous compounds having a reduced level of halogen and a stream containing hydrogen halide and less than about 500 ppm by weight of water.

BRIEF SUMMARY OF THE INVENTION

The invention provides a process for the simultaneous conversion of a halogenated organic stream containing less than about 500 ppm by weight of water or water precursors and a halogenated organic stream containing oxygen-containing compounds to produce hydrocarbonaceous compounds having a reduced level of halogen and a hydrogen halide stream containing less than about 500 ppm by weight of water. The halogenated organic stream containing less than about 500 ppm by weight of water or water precursors is treated in a first hydrogenation reaction zone to provide a resulting effluent stream which is separated to provide a hydrogen halide stream containing less than about 500 ppm by weight of water and a stream of hydrogen halide and hydrocarbonaceous compounds having a reduced level of organic halogen. The halogenated organic stream containing oxygen-containing compounds is treated in a second hydrogenation reaction zone to provide a resulting effluent stream which is contacted with a lean aqueous stream to recover hydrogen halide compounds and to provide a stream containing hydrogen and hydrocarbonaceous compounds having a reduced level of organic halogen. The present invention provides a convenient and economical method for the recovery of hydrogen halide compounds which are produced in the hydrogenation reaction zones. Important elements of the process are the integrated hydrogenation reaction zones which reduce capital and utility costs by utilizing one hydrogen recycle zone loop for both feed streams. The hydrogen halide containing less than about 500 ppm by weight of water is recovered in economical, conventional separators and fractionation equipment while the hydrogen halide which is produced concomitantly with water is recovered at a low operating pressure and the absorber is preferably constructed or lined with acid-resistant polymers.

One embodiment of the present invention may be characterized as a process for treating a halogenated organic stream containing less than about 500 ppm by weight of water or water precursors and a halogenated organic stream containing oxygen-containing compounds to produce hydrocarbonaceous compounds having a reduced level of organic halogen and a liquid stream comprising a hydrogen halide and containing less than about 500 ppm by weight water which process comprises the steps of: (a) contacting the halogenated organic stream containing less than about 500 ppm by weight of water or water precursors and at least a portion of a hydrogen-rich gaseous recycle stream with a hydrogenation catalyst in a first hydrogenation reaction zone at hydrogenation conditions to increase the hydrogen content of the halogenated organic stream containing less than about 500 ppm by weight of water or water precursors and to thereby produce hydrogen halide; (b) condensing at least a portion of a resulting effluent from the first hydrogenation reaction zone to produce a hydrogen-rich gaseous recycle stream and a liquid stream comprising hydrogenated hydrocarbonaceous compounds, hydrogen halide and containing less than about 500 ppm by weight water; (c) contacting the halogenated organic stream containing oxygen-containing compounds and at least a portion of the hydrogen-rich gaseous recycle stream produced in step (b) with a hydrogenation catalyst in a second hydrogenation reaction zone at hydrogenation conditions to increase the hydrogen content of the halogenated organic stream and to thereby produce hydrogen halide; and (d) contacting an effluent from the second hydrogenation reaction zone with a lean aqueous solution in an absorption zone to produce a hydrogen halide-rich aqueous stream and a gaseous stream comprising hydrogen.

Another embodiment of the present invention may be characterized as a process for treating a halogenated organic stream containing less than about 500 ppm by weight of water or water precursors and a halogenated organic stream containing oxygen-containing compounds to produce hydrocarbonaceous compounds having a reduced level of organic halogen and a stream comprising a hydrogen halide which process comprises the steps of: (a) contacting the halogenated organic stream containing less than about 500 ppm by weight of water or water precursors and at least a portion of a hydrogen-rich gaseous recycle stream with a hydrogenation catalyst in a first hydrogenation reaction zone at hydrogenation conditions to increase the hydrogen content of the halogenated organic stream containing less than about 500 ppm by weight of water or water precursors and to thereby produce hydrogen halide; (b) condensing at least a portion of a resulting effluent from the first hydrogenation reaction zone to produce a hydrogen-rich gaseous recycle stream and a liquid stream comprising hydrogenated hydrocarbonaceous compounds, hydrogen halide and containing less than about 500 ppm by weight water; (c) separating the liquid stream comprising hydrogenated hydrocarbonaceous compounds, hydrogen halide and containing less than about 500 ppm by weight water to produce a stream comprising hydrogen halide and containing less than about 500 ppm by weight water, and a stream comprising hydrogenated hydrocarbonaceous compounds; (d) contacting the halogenated organic stream containing oxygen-containing compounds and at least a portion of the hydrogen-rich gaseous recycle stream produced in step (b) with a hydrogenation catalyst in a second hydrogenation reaction zone at hydrogenation conditions to increase the hydrogen content of the halogenated organic stream and to thereby produce hydrogen halide; and (e) contacting an effluent from the second hydrogenation reaction zone with a lean aqueous solution in an absorption zone to produce a hydrogen halide-rich aqueous stream and a gaseous stream comprising hydrogen.

BRIEF DESCRIPTION OF THE DRAWING

The drawing is a simplified process flow diagram of a preferred embodiment of the present invention.

DETAILED DESCRIPTION OF THE INVENTION

The present invention provides an improved integrated process for the conversion of a halogenated organic stream containing less than about 500 ppm by weight of water or water precursors and a halogenated organic stream containing oxygen-containing compounds to produce hydrogen halide and hydrocarbonaceous compounds having a reduced level of organic halogen and a hydrogen halide stream containing less than about 500 ppm by weight of water. There is a steadily increasing demand for technology which is capable of treating halogenated hydrocarbonaceous compounds and, in particular, for a process which is capable of recovering a hydrogen halide stream containing less than about 500 ppm by weight of water which thereby provides an economical treating process which eliminates or at least minimizes the use of expensive construction materials for the processing plant.

In accordance with the present invention, the expression "water precursors" means oxygen-containing compounds which form water when charged to a catalytic hydrogenation zone.

A wide variety of halogenated organic compounds are candidates for feed streams in accordance with the process of the present invention. Examples of organic streams comprising halogenated organic compounds which are suitable for treatment by the process of the present invention are dielectric fluids, hydraulic fluids, heat transfer fluids, used lubricating oil, used cutting oils, used solvents, halogenated hydrocarbonaceous by-products, oils contaminated with polychlorinated biphenyls (PCB), halogenated wastes, petrochemical by-products and other halogenated hydrocarbonaceous industrial wastes. Often, in a particular place or location, two or more halogenated organic streams are present and require further treatment. A halogenated organic stream containing less than about 500 ppm by weight of water or water precursors is suitable for the production of a hydrogen halide stream containing less than about 500 ppm by weight of water while simultaneously, in accordance with the present invention, a halogenated organic stream containing oxygen-containing compounds may also be treated to produce an aqueous stream comprising hydrogen halide. The halogenated organic compounds may also contain hydrogen and are therefore then referred to as hydrocarbonaceous compounds.

In accordance with the present invention, the halogenated organic stream containing less than about 500 ppm by weight of water or water precursors is utilized as one of the feedstocks for the present invention. Examples of water precursors are oxygenated compounds such as alcohols, aldehydes, epoxides, ketones, phenols and ethers which, when subjected to hydrogenation conditions, are converted into hydrogenated compounds and water. Another feedstock which is utilized in the integrated process of the present invention is a halogenated organic stream containing oxygen-containing compounds which cannot be treated in the same manner as a halogenated organic stream containing less than about 500 ppm by weight of water or water precursors. In order to enjoy the advantages and benefits of the present invention, one of the feedstocks must necessarily be a halogenated organic stream containing less than about 500 ppm by weight of water or water precursors and the other feedstock is preferably a halogenated organic stream containing oxygen-containing compounds.

With the hereinabove-identified criteria for each of the preferred feedstocks for the present invention, preferred feedstocks comprise a component selected from the group consisting of fractionation column bottoms in the production of allyl chloride, fractionation column bottoms in the production of ethylene dichloride, fractionation column bottoms in the production of trichloroethylene and perchloroethylene, used dielectric fluids containing polychlorinated biphenyls (PCB) and halogenated benzene, used solvents, fractionation bottoms from the purification column in epichlorohydrin production, carbon tetrachloride, 1,1,1-trichloroethane, halogenated alcohols, halogenated ethers, chlorofluorocarbons and admixtures thereof.

The halogenated organic compounds which are contemplated as feedstocks in the present invention may contain a halogen selected from the group consisting of chlorine, bromine, fluorine and iodine. Preferred halogen compounds contain a halogen selected from the group consisting of chlorine and fluorine.

In accordance with the present invention, a feedstock containing halogenated organic compounds and containing less than about 500 ppm by weight of water or water precursors is introduced in admixture with a hydrogen-rich gaseous recycle stream and an optional recycle stream comprising unreacted halogenated hydrocarbonaceous compounds into a catalytic hydrogenation zone containing hydrogenation catalyst and maintained at hydrogenation conditions. This catalytic hydrogenation zone may contain a fixed, ebullated or fluidized catalyst bed. This reaction zone is preferably maintained at conditions which are chosen to dehalogenate the halogenated organic compounds which are introduced thereto. The catalytic hydrogenation zone is preferably maintained under an imposed pressure from about atmospheric to about 2000 psig and more preferably under a pressure from about 100 psig to about 1800 psig. Suitably, such reaction is conducted with a maximum catalyst bed temperature in the range of about 100° F. (38° C.) to about 850° F. (454° C.) selected to perform the desired dehalogenation conversion to reduce the concentration of or eliminate the halogenated organic compounds contained in the feed to the hydrogenation zone. In accordance with the present invention, it is contemplated that the desired hydrogenation conversion includes, for example, dehalogenation and hydrocracking. Further preferred operating conditions include liquid hourly space velocities in the range from about 0.05 $hr^{-1}$ to about 20 $hr^{-1}$ and hydrogen to feed ratios from about 200 standard cubic feet per barrel (SCFB) to about 150,000 SCFB, preferably from about 200 SCFB to about 100,000 SCFB.

In accordance with the present invention, the hydrocarbonaceous effluent containing at least one hydrogen halide compound from the hydrogenation zone which is used to treat the halogenated organic feed stream containing less than about 500 ppm by weight of water or water precursors is cooled and introduced into a vapor-liquid separator to produce a hydrogen-rich, gaseous recycle stream and a liquid stream comprising hydrogenated hydrocarbonaceous compounds and hydrogen halide. The resulting liquid stream comprising hydrogenated hydrocarbonaceous compounds and hydrogen halide may then be separated to produce a hydrogen halide stream containing less than about 500 ppm by weight of water and a liquid stream comprising hydrogenated hydrocarbonaceous compounds and any unreacted organic compounds. This resulting liquid stream may then be separated to produce an optional recycle stream comprising any unreacted halogenated organic compounds which may then be introduced into the hydrogenation reaction zone, as described hereinabove, and a hydrogenated hydrocarbonaceous stream having a reduced level of organic halogen. In accordance with one embodiment of the present invention, the hydrogen halide compound is recovered as a hydrogen halide product stream containing less than about 500 ppm by weight of water. This permits the subsequent recovery and use of a desirable and valuable hydrogen halide compound.

In accordance with the present invention, another halogenated organic feed stream containing oxygen-containing compounds is introduced in admixture with a hydrogen-rich gaseous recycle stream into a separate catalytic hydrogenation zone containing hydrogenation catalyst and maintained at hydrogenation conditions. This separate catalytic hydrogenation zone is different from the hereinabove previously-described catalytic hydrogenation zone, but is integrated into the overall process of the present invention. This second catalytic hydrogenation zone may also contain a fixed, ebullated or fluidized catalyst bed. This reaction zone is preferably maintained at conditions which are generally similar to the hydrogenation reaction conditions which have been described hereinabove. One skilled in the art of catalytic conversion of organic compounds and hydrocarbonaceous compounds will readily be able to select the appropriate hydrogenation operating conditions once a feedstock has been selected.

The resulting hydrocarbonaceous effluent from the second hydrogenation zone necessarily contains water or water vapor and is introduced into an absorption zone. A lean aqueous stream is also introduced into the absorption zone and is contacted with the effluent from the second hydrogenation zone in order to recover hydrogen halide compounds. A resulting rich aqueous stream containing hydrogen halide compounds is removed from the absorption zone and recovered. A stream containing hydrogen and normally gaseous hydrocarbons is removed from the absorption zone and recovered. The absorption zone is preferably maintained under a pressure which is less than the pressure of the upstream hydrogenation zone in the range from about ambient to about 50 psig (345 kPa gauge). Additional preferred operating conditions of the absorption zone include a temperature from about 40° F. (5° C.) to about 250° F. (121° C.). The wetted internals of the absorption zone are preferably constructed from carbon-based materials or organic polymers and other similar materials which are highly resistant to the corrosive effects of hydrogen halide compounds in a high humidity environment.

The two catalytic hydrogenation zones contain hydrogenation catalyst which may be the same or of a different composition. The preferred catalytic composite disposed within either one or both of the hereinabove-described hydrogenation zones can be characterized as containing a metallic component having hydrogenation activity, which component is combined with a suitable refractory carrier material of either synthetic or natural origin. The precise composition and method of manufacturing the carrier material is not considered essential to the present invention. Preferred carrier materials are alumina, silica, carbon and mixtures thereof. Suitable metallic components having hydrogenation activity are those selected from the group comprising the metals of Groups VIB and VIII of the Periodic Table, as set forth in the *Periodic Table of Elements*, E. H. Sargent and Company, 1964. Thus, the catalytic composite may comprise one or more metallic components from the group of molybdenum, tungsten, chromium, iron, cobalt, nickel, platinum, palladium, iridium, osmium, rhodium, ruthenium and mixtures thereof. The concentration of the catalytically-active metallic component, or components, is primarily dependent upon a particular metal as well as the physical and/or chemical characteristics of the particular hydrocarbon feedstock. For example, the metallic components of Group VIB are generally present in an amount within the range from about 1 to about 20 weight percent, the iron-group metals in an amount within the range of about 0.2 to about 10 weight percent, whereas the noble metals of Group VIII are preferably present in an amount within the range of from about 0.1 to about 5 weight percent, all of which are calculated as if these components existed within the catalytic composite in the elemental state. It is further contemplated that hydrogenation catalytic composites may comprise one or more of the following components: cesium, francium, lithium, potassium, rubidium, sodium, copper, gold, silver, cadmium, mercury and zinc. Preferred hydrogenation catalysts comprise alumina and palladium.

In the drawing, the process of the present invention is illustrated by means of a simplified flow diagram in which such details as total number of reaction zones and dryer vessels, pumps, instrumentation, heat exchange and heat-recovery circuits, compressors and similar hardware have been deleted as being non-essential to an understanding of the techniques involved. The use of such miscellaneous equipment is well within the purview of one skilled in the art.

DETAILED DESCRIPTION OF THE DRAWING

With reference now to the drawing, a halogenated organic stream containing less than about 500 ppm by weight of water or water precursors is introduced into the process via conduit 8 and admixed with an optional recycle stream containing unreacted halogenated organic compounds provided via conduit 27, and the resulting admixture is transported via conduit 9. A hydrogen-rich gaseous recycle stream is provided via conduit 21 and joins the admixture carried via conduit 9. The halogenated organic stream containing less than about 500 ppm by weight of water or water precursors, the hydrogen-rich gaseous recycle stream and the optional unconverted halogenated organic recycle stream is transported via conduit 10 and introduced into hydrogenation reaction zone 11. The resulting hydrogenated organic stream is removed from hydrogenation reaction zone 11 via conduit 12, is cooled in heat-exchanger 13, is transported via conduit 14 and introduced into vapor-liquid separator 15. A hydrogen-rich gaseous stream is removed from vapor-liquid separator 15 via conduits 16 and 18, and introduced into heat exchanger 19. After heating, the effluent from heat exchanger 19 is transported via conduit 20 and split into two heated, hydrogen-rich gaseous streams which are transported by conduits 21 and 22 to serve as gaseous streams to hydrogenation reaction zone 11 and hydrogenation reaction zone 3, respectively. Since hydrogen is lost in the process by means of a portion of the hydrogen being dissolved in the exiting liquid hydrocarbon and hydrogen being consumed during the hydrogenation reaction, it is necessary to supplement the hydrogen-rich gaseous stream with a makeup hydrogen from some suitable external source, for example, a catalytic reforming unit, an electrolysis plant or a hydrogen plant. Makeup hydrogen may be introduced into the system at any convenient and suitable point and is provided via conduit 17 in the drawing. A liquid hydrogenated hydrocarbonaceous stream containing hydrogen and a hydrogen halide in solution is removed from vapor-liquid separator 15 via conduit 23 and is introduced into fractionation zone 24. A hydrogen halide product stream containing less than about 500 ppm by weight of water is removed from fractionation zone 24 via conduit 25 and recovered. A distillable hydrogenated hydrocarbonaceous stream is removed from fractionation zone 24 via conduit 26. A stream of unconverted halogenated organic compounds is removed from fractionation zone 24 via conduit 27 and is recycled via conduits 27, 9 and 10 into hydrogenation reaction zone 11 as hereinabove described. A halogenated organic stream containing oxygen-containing compounds is introduced into the process via conduit 1 and is admixed with a hydrogen-rich gas stream provided via conduit 22 and the resulting admixture is transported via conduit 2 into hydrogenation reaction zone 3. The resulting hydrogenated organic stream is removed from hydrogenation reaction zone 3 via conduit 4 and introduced into halide absorber 5. A lean aqueous stream is introduced into halide absorber 5 via conduit 28 and contacts the hydrogenated effluent from hydrogenation zone 3 to recover hydrogen halide compounds. A stream containing hydrogen and normally gaseous hydrocarbons is removed from halide absorber 5 via conduit 6 and recovered. A rich aqueous stream containing hydrogen halide compounds is removed from halide absorber 5 via conduit 7 and recovered.

The following illustrative embodiment is presented for the purpose of further illustrating the process of the present invention and to indicate the benefits afforded by the utilization thereof in producing hydrogenated hydrocarbonaceous compounds having a reduced concentration of halogen.

ILLUSTRATIVE EMBODIMENT

A halogenated organic stream containing 80% dichloropropane, 20% dichloropropene and less than about 500 ppm by weight of water or water precursors is charged to a first hydrogenation zone containing a palladium on alumina catalyst which is operated at hydrogenation conditions which include an average catalyst temperature of 392° F. (200° C.), a pressure of 765 psig (5275 kPa gauge), and a weight hourly space velocity of 0.3. A hydrogen-rich recycle gas containing 65% hydrogen, 28% hydrogen chloride and 7% propane is also introduced into the first hydrogenation zone at a hydrogen to feed ratio of 54,000 SCFB (9100 n m$^3$/m$^3$).

The resulting effluent from the first hydrogenation zone is cooled to a temperature of +5° F. (−15° C.) and introduced into a vapor-liquid separator to produce a hydrogen-rich gaseous phase which is admixed with fresh hydrogen makeup to produce the hereinabove-described hydrogen-rich recycle gas. A liquid stream containing about 65% hydrogen chloride and 35% propane is removed from the vapor-liquid separator and introduced into a fractionation zone to produce a pure stream of hydrogen chloride and a pure stream of propane.

A halogenated organic stream containing oxygen-containing compounds and containing 10% dichloropropane, 40% dichloropropyl ether and 50% carbon tetrachloride is charged to a second hydrogenation zone containing a palladium on alumina catalyst which is operated at hydrogenation conditions which include an average catalyst temperature of 302° F. (150° C.), a pressure of 765 psig (5275 kPa gauge) and a weight hourly space velocity of 0.3. A hydrogen-rich recycle gas containing 65% hydrogen, 28% hydrogen chloride and 7% propane is also introduced into the second hydrogenation zone at a hydrogen to feed ratio of about 50,000 SCFB (8400 n m$^3$/m$^3$).

The resulting effluent from the second hydrogenation zone is cooled and introduced into an absorber and contacted with water at absorber conditions including a pressure of 10 psig (68.95 kPa gauge) and a temperature of 104° F. (40° C.). An aqueous liquid stream containing 15% hydrogen chloride is recovered from the absorber. A stream containing hydrogen and normally gaseous hydrocarbons is removed from the absorber and recovered.

The foregoing description, drawing and Illustrative Embodiment clearly illustrate the advantages encompassed by the method of the present invention and the benefits to be afforded with the use thereof.

What is claimed:

1. A process for treating a halogenated organic stream containing less than about 500 ppm by weight of water or water precursors and a halogenated organic stream containing oxygen-containing compounds to produce hydrocarbonaceous compounds having a reduced level of organic halogen and a liquid stream comprising a hydrogen halide and containing less than about 500 ppm by weight water which process comprises the steps of:

(a) contacting said halogenated organic stream containing less than about 500 ppm by weight of water or water precursors and at least a portion of a hydrogen-rich gaseous recycle stream with a hydrogenation catalyst in a first hydrogenation reaction zone at hydrogenation conditions to increase the hydrogen content of the halogenated organic stream containing less than about 500 ppm by weight of water or water precursors and to thereby produce hydrogen halide;

(b) condensing at least a portion of a resulting effluent from said first hydrogenation reaction zone to produce a hydrogen-rich gaseous recycle stream and a liquid stream comprising hydrogenated hydrocarbonaceous compounds, hydrogen halide and containing less than about 500 ppm by weight water;

(c) contacting said halogenated organic stream containing oxygen-containing compounds and at least a portion of said hydrogen-rich gaseous recycle stream produced in step (b) with a hydrogenation catalyst in a second hydrogenation reaction zone at hydrogenation conditions to increase the hydrogen content of said halogenated organic stream and to thereby produce hydrogen halide; and (d) contacting an effluent from said second hydrogenation reaction zone with a lean aqueous solution in an absorption zone to produce a hydrogen halide-rich aqueous stream and a gaseous stream comprising hydrogen.

2. The process of claim 1 wherein said halogenated organic stream containing oxygen-containing compounds comprises compounds selected from the group consisting of alcohols, aldehydes, epoxides, ketones, phenols and ethers.

3. The process of claim 1 wherein said halogenated organic stream containing oxygen-containing compounds comprises a component selected from the group consisting of dielectric fluids, hydraulic fluids, heat transfer fluids, used lubricating oil, used cutting oils, used solvents, halogenated hydrocarbonaceous by-products, oils contaminated with polychlorinated biphenyls (PCB), halogenated wastes, petrochemical by-products from the production of ethylene dichloride, vinyl chloride, propylene oxide, allyl chloride, epichlorohydrin and chlorinated solvents and other halogenated hydrocarbonaceous industrial wastes.

4. The process of claim 1 wherein said halogenated organic stream containing less than about 500 ppm by weight of water or water precursors comprises a component selected from the group consisting of dielectric fluids, hydraulic fluids, heat transfer fluids, used lubricating oil, used cutting oils, used solvents, halogenated hydrocarbonaceous by-products, oils contaminated with polychlorinated biphenyls (PCB), halogenated wastes, petrochemical by-products from the production of ethylene dichloride, vinyl chloride, allyl chloride and chlorinated solvents and other halogenated hydrocarbonaceous industrial wastes.

5. The process of claim 1 wherein said first hydrogenation reaction zone is operated at conditions which include a pressure from about atmospheric to about 2000 psig (13790 kPa gauge), a maximum catalyst temperature from about 100° F. (38° C.) to about 850° F. (454° C.) and a hydrogen to feed ratio from about 200 standard cubic feet per barrel (SCFB) to about 150,000 (SCFB).

6. The process of claim 1 wherein said second hydrogenation reaction zone is operated at conditions which include a pressure from about atmospheric to about 2000 psig (13790 kPa gauge), a maximum catalyst temperature from about 100° F. (38° C.) to about 850° F. (454° C.) and a hydrogen to feed ratio from about 200 standard cubic feet per barrel (SCFB) to about 150,000 (SCFB).

7. The process of claim 1 wherein said halogenated organic compounds contain a halogen selected from the group consisting of chlorine, fluorine and bromine.

8. The process of claim 1 wherein said hydrogen halide is selected from the group consisting of hydrogen chloride, hydrogen fluoride and hydrogen bromide.

9. The process of claim 1 wherein said first hydrogenation zone contains a hydrogenation catalyst comprising palladium.

10. The process of claim 1 wherein said first hydrogenation zone contains a hydrogenation catalyst comprising alumina and palladium.

11. The process of claim 1 wherein said second hydrogenation zone contains a hydrogenation catalyst comprising palladium.

12. The process of claim 1 wherein said second hydrogenation zone contains a hydrogenation catalyst comprising alumina and palladium.

13. The process of claim 1 wherein said absorption zone is operated at conditions which include a pressure from about ambient to about 50 psig (345 kPa gauge) and a temperature from about 40° F. (5° C.) to about 250° F. (121° C.).

14. The process of claim 1 wherein said absorption zone has wetted internal surfaces constructed from materials selected from the group consisting of organic polymers and carbon-based materials.

15. The process of claim 1 wherein condensing in step (b) is conducted at conditions including a temperature in the range from about −40° F. (−40° C.) to about 104° F. (40° C.) and a pressure in the range from about atmospheric to about 2000 psig (13790 kPa gauge).

16. The process of claim 1 wherein said liquid stream comprising hydrogenated hydrocarbonaceous compounds, hydrogen halide and containing less than about 500 ppm by weight water recovered in step (b) is separated to produce a stream comprising hydrogen halide and containing less than about 500 ppm by weight water, and a stream comprising hydrogenated hydrocarbonaceous compounds.

17. The process of claim 1 wherein said halogenated organic stream containing oxygen-containing compounds comprises a $C_1$ halogenated compound.

18. A process for treating a halogenated organic stream containing less than about 500 ppm by weight of water or water precursors and a halogenated organic stream containing oxygen-containing compounds to produce hydrocarbonaceous compounds having a reduced level of organic halogen and a stream comprising a hydrogen halide which process comprises the steps of:

(a) contacting said halogenated organic stream containing less than about 500 ppm by weight of water or water precursors and at least a portion of a hydrogen-rich gaseous recycle stream with a hydrogenation catalyst in a first hydrogenation reaction zone at hydrogenation conditions to increase the hydrogen content of the halogenated organic stream containing less than about 500 ppm by weight of water or water precursors and to thereby produce hydrogen halide;

(b) condensing at least a portion of a resulting effluent from said first hydrogenation reaction zone to produce a hydrogen-rich gaseous recycle stream and a liquid stream comprising hydrogenated hydrocarbonaceous compounds, hydrogen halide and containing less than about 500 ppm by weight water;

(c) separating said liquid stream comprising hydrogenated hydrocarbonaceous compounds, hydrogen halide and containing less than about 500 ppm by weight water to produce a stream comprising hydrogen halide and containing less than about 500 ppm by weight water, and a stream comprising hydrogenated hydrocarbonaceous compounds;

(d) contacting said halogenated organic stream containing oxygen-containing compounds and at least a portion of said hydrogen-rich gaseous recycle stream produced in step (b) with a hydrogenation catalyst in a second hydrogenation reaction zone at hydrogenation conditions to increase the hydrogen content of said halogenated organic stream and to thereby produce hydrogen halide; and (e) contacting an effluent from said second hydrogenation reaction zone with a lean aqueous solution in an absorption zone to produce a hydrogen halide-rich aqueous stream and a gaseous stream comprising hydrogen.

* * * * *